3,287,377
19-OXYGENATED STEROIDS FROM 5α-HALOGEN-6β:19-OXIDO-STEROIDS
Albert Wettstein, Riehen, and Georg Anner, Karl Heusler, and Jaroslav Kalvoda, Basel, and Hellmut Ueberwasser, Riehen, Switzerland, assignors to Ciba Corporation, New York, N.Y., a corporation of Delaware
No Drawing. Filed Sept. 7, 1962, Ser. No. 222,186
Claims priority, application Switzerland, July 15, 1960, 8,133/60; Oct. 28, 1960, 12,107/60; Dec. 23, 1960, 14,393/60; Apr. 5, 1961, 3,990/61; June 2, 1961, 6,481/61; Sept. 12, 1961, 10,580/61
9 Claims. (Cl. 260—397.2)

The present invention concerns oxygenated $\Delta^5$-steroids and a new process for their preparation starting from 5α-halogeno-6β:19-oxido-steroids.

The term "19-oxygenated steroids" designates 19-norsteroids which contain in the 10-position a hydroxymethyl, acyloxymethyl, formyl, acetalized formyl, carboxy and esterified carboxy group.

This application is a continuation-in-part of our copending application Ser. No. 122,655, filed July 10, 1961, by Albert Wettstein et al., now Pat. No. 3,067,198.

The process of this invention is an important step in a novel and simple conversion of normal steroids into 19-nor-steroids. Since a number of 19-nor-steroids, more especially derivatives of 19-nor-testosterone and of 19-nor-progesterone, are used extensively as anabolic, androgenic, gestagenic and progestational agents a new process for the production of these compounds is of great importance. So far the 19-nor-steroids were available only by a complicated sequence of reactions which involve pyrolytic aromatization of the ring A and subsequent reduction with an alkali metal and ammonia. An alternative systhesis uses a microbiological hydroxylation of the 19-carbon atom followed by elimination of the angular C–19-substituent. The yield in the hydroxylation step however is in most cases unsatisfactory. In both known processes the possibilities for variations in substituents in ring B, C and D are very restricted due to the drastic conditions in the pyrolysis step on one hand and to the substrate-specificity of the enzymatic reaction on the other hand.

The new process however gives not only high yield of the desired end products but can be applied to a wide variety of different steroids since oxo groups, ketalized oxo groups, esterified and etherified hydroxy groups, halogen substituents or double bonds do not interfere in the reaction claimed.

The new process for the production of 19-nor-compounds however gives not only high yields of the desired end products, but can be applied to a wide variety of different steroids since oxo groups, ketalized oxo groups, esterified and etherified hydroxyl groups or double bonds do not interfere with the reactions used in the new process. This new process consists in (a) Treating a 19-unsubstituted 5α-halogen-6β-hydroxy-steroid with a system generating monovalent positive iodine (e.g. with a lead tetraacylate and iodine) under such conditions as will bring about a homolytic cleavage of any 6-hypoiodite formed (e.g. by boiling in cyclohexane solution under irradiation with visible light) or with a lead tetraacylate in an apolar solvent (e.g. methyl cyclohexane or benzene).

(b) Reducing the 5a - halogen - 6β:19 - oxido - steroid formed, if desired after further oxidation to a 19:6-lactone of a 5α-halogen-6β-hydroxy-19-oic acid, to a 19-oxygenated $\Delta^5$-steroid, and (c) Eliminating the oxygenated C–19-methyl group after introduction of a $\Delta^4$-3-oxo-grouping in known manner by base or acid treatment.

The present invention is concerned with part (b) of the above process. It consists in treating a 5a-halogen-6β:19-oxido-steroid with a metallic reducing agent.

The 5a-halogen-6α:19-oxido-steroids used as starting materials in the process of the invention may contain in position 19 also a free or functionally converted hydroxyl group or an oxo group, e.g. it is also possible to use the cyclic 19:6β-hemiacetals of 5a-halogen-6β-hydroxy-19-oxo-steroids and their derivatives or the 19:6β-lactones of 5a-halogen-6β-hydroxy-19-oic acids.

These starting materials may belong to the androstane, pregnane, cholane, cholestane, spirostane, stigmastane and cardanolide series. Their ring system may contain further substituents, more especially in position 3 a free or esterified hydroxyl group and in one or several of the positions 1, 2, 4, 7 to 9, 11, 12, 14 to 17, 20 and 21, such as free or functionally converted hydroxyl or oxo groups, hydrocarbon radicals, and/or halogen atoms. The term "functionally converted hydroxy and oxo groups" designates esterified or etherified hydroxy groups or ketalized oxo groups. Compounds containing oxo groups may also be converted into enol derivatives, such as enol ethers or enol esters. Furthermore the new compounds may contain double bonds or oxide groups, for example in positions 9:11 or 16:17.

The acyloxy radicals mentioned above, representing esterified hydroxyl groups, are more especially those of aliphatic, cycloaliphatic, cycloaliphatic-aliphatic, araliphatic, aromatic or heterocyclic carboxylic acids containing at most 15 carbon atoms, such as for example formic, acetic, propionic, butyric, valeric, trimethylacetic, caproic, oenanthic, decanoic, trifluoracetic, carbonic-monomethyl- or ethylester, hexahydrobenzoic, cyclopentyl-propionic, phenyl-propionic, benzoic or furoic acid. The halogen atoms mentioned are fluorine, chlorine or bromine, in the 5α-position especially chlorine or bromine, and the lower alkyl, alkenyl or alkinyl radicals are such as contain at most 7 carbon atoms, for example methyl, ethyl, n- or i-propyl, -butyl, -pentyl, -hexyl or -heptyl, vinyl, allyl, methallyl, ethinyl, 2-methyl-ethinyl, 2-chloro-ethinyl and 2-trifluoromethyl-ethinyl.

Ketalized oxo groups are for example lower alkylenedioxy groups, such as ethylenedioxy or propylenedioxy groups and etherified hydroxy groups are for example lower alkoxy groups, such as methoxy, ethoxy or propoxy groups or the tetrahydro-pyranyloxy group.

The starting materials are prepared from 19-unsubstituted 5α-halogen-6β-hydroxy-steroids by the processes mentioned above under part (a) and described in detail in our copending applications Ser. No. 222,168, filed September 7, 1962, now Patent No. 3,211,726, and Ser. No. 222,207, filed September 7, 1962.

Among the various starting materials which are important in the claimed process the following may be mentioned: 3-hydroxy-5α-halogen-6β:19-oxido-spirostane and its ester, e.g. 3β-acetoxy-5α-chloro-6β:19-oxido-spirostane, 3β:17β-dihydroxy-5α-chloro- and -5α-bromo-6β:19-oxido-androstane and its ester, 3β-hydroxy-5α-chloro- and -5α-bromo-6β:19-oxido - 17 - oxo-androstane and its ester, 3β:17β-dihydroxy-5α-chloro- and -5α-bromo-6β:19-oxido-17α-alkyl-, especially -17α-methyl- and -17α-ethyl-androstane and its ester, 3β:17β-dihydroxy-5α-chloro- and -5α-bromo-6β:19-oxido - 17α - allyl-androstane and its ester, 3β:20-dihydroxy-5α-chloro- and -5α-bromo-6β:19-oxido-pregnane and its ester, 3β-hydroxy-5α-chloro- and -5α-bromo-6β:19-oxido-20-oxo-pregnane and its ester, 3β-hydroxy-5α-chloro- and -5α-bromo - 6β:19 - oxido-16:17α-oxido-20-oxo-pregnane and its ester, 3β:17α-dihydroxy-5α-chloro- and -5α-bromo-6β:19-oxido-20-oxo-pregnane and its ester, and 3β:11α:20-trihydroxy-5α-chloro-6β:19-oxido-pregnane and its ester. In addition 19:6β-lactones of 5α-halogen-6β-hydroxy-steroid-19-oic acids may be used, which are prepared from the above 5α-halogeno-6β:19-oxido-steroids by oxidation with strong oxidizing agents for example with ruthenium tetroxide or with chromium trioxide or tertiary butyl chromate in solvents such as lower fatty acids (acetic acid, propionic acid, etc.) or in halogenated hydrocarbon such as carbon tetrachloride preferably at an elevated temperature for example between 50 and 100° C. The 19:6β-lactones may also be obtained by oxidation of 5α-halogen-6β:19-oxido-19-hydroxy-steroids which are formed from 11-substituted 5α-halogen-6β-hydroxy-steroids by treating them with lead tetraacetate and iodine in boiling cyclohexane.

Although in 5α-halogen-6β:19-oxido-steroids the oxido-bridge is very stable towards hydrolytic agents the opening of the oxide is very easily achieved by reductive means according to the present invention. The reducing agents which can be used are those which are generally suitable for the conversion of halohydrins to olefines, in particular as metallic reducing agent, for example a metal of the first main group or the second main and subgroup of the Periodic Table, such as lithium, sodium, potassium calcium or zinc. For the reduction the alkali and alkaline earth metals are advantageously dissolved in liquid ammonia or a liquid amine such as ethylamine, isopropylamine or ethylenediamine, if desired with addition of a diluent, such as diethylether, tetrahydrofurane or dioxane. Zinc is advantageously used together with an alcohol, for example a lower alkanol, such as methanol, ethanol or propanol or a lower fatty acid such as acetic or propionic acid.

Under the aforementioned reaction conditions $\Delta^5$-19-hydroxy-steroids are formed from 19-unsubstituted 5α-halogen-6β:19-oxides. The reductive opening of the 6β:19-oxides with alkali and alkaline earth metals may be accompanied by reduction of other functional groups, such as other oxides, for example 16:17-oxides, esters or oxo groups unless they have previously been protected by ketalization or enol ether formation.

In the case of the 19:6β-hemiacetals of 5α-halogeno-6β-hydroxy-19-oxo-steroids, and of the 19:6β-lactones of 5α-halogeno-6β-hydroxy-steroid-19-acids, the reductive opening can be performed under esepecially mild conditions, above all with zinc and an alcohol and particularly smoothly also with zinc and a lower fatty acid. From the 5-halogeno-lactones a good yield of $\Delta^5$-steroid-19-oic acids and from 5α-halogeno-6β:19-oxido - 19 - hydroxy-steroids $\Delta^5$-19-oxo-steroids are obtained in excellent yield.

The steroid-19-acids obtained by the present process are easy to convert into the corresponding methyl esters or ethyl esters, for example with diazomethane or diazoethane.

It is also possible to oxidize the oxygenated C-19-methyl group further, after having opened up the 6β:19-oxygen bridge by the present process. Thus, for example, it is possible to obtain from a resulting $\Delta^5$-19-hydroxy compound a $\Delta^5$-19-acid, for example by oxidation with chromium trioxide in glacial acetic acid or acetone. Reaction with chromic acid in pyridine furnishes predominantly $\Delta^5$-19-oxo-compounds. If a free 3-hydroxy group is present, this group may be protected before the oxidation, for example by selective esterification, e.g. acetylation by boiling in glacial acetic acid.

Any acyloxy groups present in the $\Delta^5$-19-hydroxysteroids or $\Delta^5$-19-oxo-steroids obtained by the process of the invention, for example in positions 3, 11, 17 and/or 20, may be hydrolized if desired after acetalization of a 19-oxo group and the resulting hydroxy compounds oxidized to form the corresponding ketones. $\Delta^5$-3-ketones can easily be isomerized to $\Delta^4$-3-ketones.

If desired a $\Delta^5$-17-oxo-19-hydroxy-androstene obtained according to the process of the invention, may be reacted preferably after protection of the 19-hydroxy group for example by formation of a 19-tetrahydropyranyloxy-derivative, with an alkyl-metal, alkenyl-metal or alkinyl-metal compound, for example with methyl magnesium iodide, methyl lithium, ethyl magnesium iodide, isobutyl lithium, allyl magnesium bromide, methallyl magnesium bromide, sodium-, potassium- or lithium-acetylide, propargyl magnesium bromide or lithium 2-methyl-acetylide; in this manner there are obtained (without the 5α-halogeno group being affected) the corresponding 17β-hydroxy-17α-alkyl-, -alkenyl- or -alkinyl-androstanes. Following upon the reaction with the afore-mentioned organo-metal compounds a $\Delta^4$-3-oxo grouping may be formed in the manner described above.

The side chain of $\Delta^5$-3β-acetoxy-19-hydroxy-spirostene can be degraded in known manner for example by heating with a carboxylic acid anhydride and subsequent oxidation of the resulting furostene (pseudo-sapogenin) whereby a $\Delta^{5:16}$-3β:19-diacetoxy-20-oxo-pregnadiene is obtained.

The final transformation of the 19-oxygenated $\Delta^5$-steroids into 19-nor-steroids is performed in known manner. It comprises oxidation of a $\Delta^5$-3-hydroxy-steroid to a $\Delta^4$-3-oxo-steroid and elimination of the angular oxygenated substituent by treatment with base or acid. Oxidation and elimination can be performed in one step if the oxidation is carried out according to the method of Openauer, i.e. by treatment with aluminum-alkoxide and a ketone, for example with aluminum tertiary butoxide and cyclohexanone in boiling toluene.

The following examples illustrate the invention. The temperatures are given in degrees centigrade.

*Example 1*

100 cc. of ammonia are condensed at a bath temperature of 60° C. in a 4-necked flask equipped with stirring means, gas inlet tube, dropping funnel and reflux condenser with moisture closure and gas discharge tube. 1.00 gram of lithium metal is then added in portions and forms a blue solution in the ammonia. In rapid succession a solution of 3.00 grams of 3β-acetoxy-5α-chloro-6β:19-oxido-cholestane in 50 cc. of absolute ether is then stirred in dropwise. The cooling bath is then removed and the ammonia is evaporated in the course of 2 hours with stirring and while passing over a current of dry nitrogen, and at intervals of 20 minutes portions of 25 cc. each of absolute ether are added. The excess lithium is destroyed with methanol, and the reaction mixture is acidified with dilute sulfuric acid, diluted with ether, and then worked up. The ethereal solution is washed successively with water, sodium bicarbonate solution and water, dried with sodium sulfate and evaporated under vacuum, to yield 2.52 grams of an oily product which crystallizes when sprinkled with methanol. On recrystallization from methylene chloride+methanol it yields 1.130 grams of $\Delta^5$-3β:19-dihydroxy-cholestene (19-hydroxy-cholesterol) melting at 153–155° C. The infra-red absorption spectrum contains characteristic bands, inter alia, at 2.80, 6.86, 7.30, 7.36, 7.50, 9.25, 9.70, 9.85, 10.30, 10.48, 10.87, 11.30 and 11.90μ.

In the nuclear magnetic resonance spectrum the maximum of the C–19-methyl group is absent, but there appear maxima at 153–184 cycles and at 45–48.5 cycles which may be attributed to the protons of the —CH$_2$—OH and —C=CH— groupings respectively.

In an analogous manner 5.0 grams of 3β-acetoxy-5α-chloro-6β:19-oxido-spirostane yield 3.6 grams of 19-hydroxy-diosgenin.

*Example 2*

750 mg. of lithium metal are disolved in portions with stirring at −60° C. in 100 cc. of liquid ammonia. The blue solution is treated with 1.00 gram of 3β-acetoxy-5α-chloro-6β:19-oxido-17-oxo-androstane and rinsed with 50 cc. of absolute ether. While stirring, without external cooling, a current of dry nitrogen is then passed for 1.5 hours over the reaction solution and the evaporated ammonia is replaced by absolute ether. The excess lithium is decomposed with methanol, and the mixture is kept for 18 hours at room temperature, acidified with dilute sulfuric acid and extracted with chloroform, to yield 857 mg. of an oil which crystallizes on being sprinkled with ethyl acetate+ether. In this manner $\Delta^5$-$3\beta$:19:17-trihydroxyandrostene melting at 231–233° C. is obtained.

*Example 3*

From a solution of 350 mg. of $\Delta^5$-$3\beta$:19-dihydroxycholestene in 15 cc. of absolute toluene and 5 cc. of cyclohexanone about 5 cc. of solvent are distilled off, and the reaction mixture is treated with a solution of 470 mg. of aluminum isopropylate in 10 cc. of toluene and the whole is refluxed with stirring for 15 hours. The mixture is cooled, acidified with dilute sulfuric acid, taken up in ether, washed until neutral, dried and evaporated in vacuum. To free the residue from cyclohexanone and cyclohexanol it is subjected to steam distillation. The nonvolatile matter is taken up in ether and the reaction product is isolated in the usual manner; it is obtained in the form of a non-crystallizing oil and is purified by chromatography on alumina. In this manner amorphous 19-nor-$\Delta^4$-3-oxo-cholestene is obtained in a yield of 15 to 20%. The infra-red absorption spectrum of the pure compound displays bands, inter alia, at 6.00, 6.85, 7.25, 7.35, 7.55, 8.30, 9.00, 10.36 and 11.30$\mu$.

*Example 4*

A solution of 5 grams of $3\beta$-acetoxy-$5\alpha$-chloro-$6\beta$:19-oxido-17-oxo-androstane in 100 cc. of glacial acetic acid is treated at 85–90° C. in the course of 30 minutes with a solution of 7.5 grams of chromium trioxide in 7.5 cc. of water and 60 cc. of glacial acetic acid. After a further reaction period of 15 minutes the batch is diluted with water and extracted with methylene chloride. The methylene chloride solution is washed successively with water and sodium bicarbonate solution, dried with sodium sulfate and evaporated, to yield 2.2 grams of the lactone of $3\beta$ - acetoxy-$5\alpha$-chloro-$6\beta$-hydroxy-17-oxo-androstane-19-acid which crystallizes on addition of ether and is freed from any adhering residual oxido compound by recrystallization from alcohol. The pure compound melts at 198–199° C.

A mixture of 2.0 grams of 19:$6\beta$-lactone of $3\beta$-acetoxy-$5\alpha$-chloro-$6\beta$-hydroxy-17-oxo-androstane-19-acid, a paste of active zinc prepared by washing 100 g. of zinc dust with N-acetic acid and then with glacial acetic acid, and admixed with 40 cc. of glacial acetic acid to improve its stirrability is stirred under reflux for 2 hours. After this time the conversion of the above lactone into $\Delta^5$-$3\beta$-acetoxy-17-oxo-androstene-19-acid is complete. The excess zinc is suctioned off, the filtrate concentrated in vacuum, the residue taken up in chloroform, the chloroform solution is washed with 2 N-sulfuric acid and then with water, dried and evaporated, to yield said acid in the form of colorless crystals. After having been recrystallized from methanol+ether they melt at 252–253° C. without evolution of gas.

By treating the above acid in chloroform solution with ethereal diazomethane solution at room temperature for a few minutes, the $\Delta^5$-$3\beta$-acetoxy-17-oxo-androstene-19-acid methyl ester is obtained which melts at 188–189° C. after recrystallization from ether.

A solution of 1.7 grams of $\Delta^5$-$3\beta$-acetoxy-17-oxo-androstene-19-acid methyl ester in 200 cc. of methanol is treated under nitrogen with a solution of 2 grams of potassium carbonate in 10 cc. of water and boiled and stirred for 1 hour. The reaction mixture is cooled, considerably concentrated under vacuum and then extracted with chloroform. The chloroform solution is dried and evaporated, to yield 1.5 grams of $\Delta^5$-$3\beta$-hydroxy-17-oxo-androstene-19-acid methyl ester which crystallizes from isopropanol in crystals melting at 188–190° C.

1.25 grams of the latter compound are dissolved in 50 cc. of acetone and the solution is treated at 0° C. with 1.5 cc. of a solution, diluted with water to 50 cc., of 13.3 grams of chromium trioxide and 11.5 cc. of concentrated sulfuric acid, and the mixture is stirred for 10 minutes. The reaction mixture is then poured into 100 cc. of an aqueous sodium acetate solution of 10% and extracted with methylene chloride. The crude product obtained from the extracts is the $\Delta^5$-3:17-dioxo-androstene-19-acid methyl ester which is dissolved in 100 cc. of methanol. The solution is treated with 5 grams of potassium hydroxide and heated for 5 hours at the boil under nitrogen. 7.5 cc. of glacial acetic acid are then added and the whole is evaporated almost to dryness in a water-jet vacuum. The residue is taken up in methylene chloride, washed with water and the dried organic solution is evaporated. From the residue $\Delta^4$-3:17-dioxo-19-nor-androstene is obtained by chromatography on alumina.

Analogous reduction with zinc of 1.00 grams of the 6:19-lactone of the $3\beta$:$17\beta$-diacetoxy-$5\alpha$-chloro-$6\beta$-hydroxy-androstane-19-acid yields after recrystallization from methylene chloride-ether 815 mg. of pure $\Delta^5$-$3\beta$:$17\beta$-diacetoxy-androstene-19-acid melting at 201–202° C., $[\alpha]_D = -115°$ (in chloroform).

*Example 5*

200 cc. of ammonia are condensed in a stirring flask of 500 cc. capacity, and 1.5 grams of lithium metal are then added in small portions. The resulting blue solution is treated dropwise within 15 minutes with 1.95 grams of $3\beta$:$20\beta$-diacetoxy-$5\alpha$-chloro-$6\beta$:19-oxido-pregnane in 20 cc. of tetrahydrofuran and the whole is stirred for 1.5 hours longer. A mixture of 20 cc. of methanol and 100 cc. of ether is then slowly added, and the ammonia is allowed to evaporate. Finally, another 100 cc. of tetrahydrofuran are added, for 1 hour nitrogen is passed through the suspension which is then diluted with 200 cc. of water and repeatedly extracted with methylene chloride. The extracts are washed with dilute sulfuric acid and with water, dried and evaporated, to yield 1.82 grams of crude $\Delta^5$-$3\beta$:19:$20\beta$-trihydroxy-pregnene which is dissolved in 200 cc. of acetone and stirred for 35 minutes at 0° C. with 5.0 cc. of a solution, diluted with water to 50.0 cc. of 13.3 grams of chromium trioxide in 11.5 cc. of concentrated sulfuric acid. A solution of 50 grams of crystalline sodium acetate in 80 cc. of water is then added, the whole is diluted with 500 cc. of benzene, the solution is repeatedly washed with water, and the aqueous solution is repeatedly extracted with benzene. The solution is dried and evaporated in water-jet vacuum, and the residue contain the $\Delta^5$-3:11:19:20-tetraoxo-pregnene and is taken up in 100 cc. of chloroform and saturated at +10° C. with hydrogen chloride gas. The mixture is left to itself for 16 hours at 25° C. and then evaporated in a waterjet vacuum. Chromatography of the residue on 30 grams of alumina yields 810 mg. of 19-nor-progesterone melting at 141–144° C.

*Example 6*

3.0 grams of zinc dust are added to a solution of 1.0 gram of $3\beta$-acetoxy-$5\alpha$-bromo-$6\beta$:19-oxido-17-oxo-androstane in 30 ml. of glacial acetic acid, and the mixture stirred for 12 hours at 100° C. It is then cooled, any unconsumed zinc is filtered off, and the filtrate diluted with methylene chloride. The solution is then washed with water, dilute sodium bicarbonate solution, and water, dried and evaporated. There are obtained 897 mg. of $\Delta^5$-$3\beta$:19 diacetoxy-17-oxo-androstene which, after being crystallized from methanol+water melt at 103–105° C.; optical rotation $[\alpha]_D^{25} = -39.6°$ (in chloroform); IR bands, inter alia at 5.75$\mu$, 5.76$\mu$, 8.15$\mu$ and 9.73$\mu$.

*Example 7*

2.5 grams of $3\beta$:$17\beta$-diacetoxy-$5\alpha$-bromo-$6\beta$:19-oxido-androstane are dissolved in 75 ml. of glacial acetic acid.

To this solution are added 10.0 grams of zinc dust and the mixture stirred for 10 hours at 100° C. It is then cooled, the unconsumed zinc filtered off, and the filtrate evaporated in a water-jet vacuum. The residue is taken up in methylene chloride and water, the organic solution washed neutral, dried and evaporated. The residue (1.97 grams) which contains the $\Delta^5$-3$\beta$:17$\beta$:19-triacetoxy-androstene, is dissolved in 100 ml. of methanol and, after the addition of 2.5 grams of potassium carbonate in 10 ml. of water, the mixture is heated to the boil for 3 hours. After that, 3.5 ml. of glacial acetic acid are added, the solution concentrated in a water-jet vacuum to about 50 ml., extracted again with a 5:1 mixture of methylene chloride and methanol, the extracts washed with water, dried and evaporated. By crystallizing the residue from ethyl acetate+ether there are obtained 1.35 grams of pure $\Delta^5$-3$\beta$:17$\beta$:19-trihydroxy-androstene of melting point 231–233° C.

Example 8

100 mg. of 3$\beta$:11$\alpha$:20$\beta$-triacetoxy-5$\alpha$-chloro-6$\beta$:19-oxido-19-hydroxypregnane are dissolved in 5 cc. of glacial acetic acid and stirred for one hour at 100° C. after adding 1.0 gram of zinc dust. The unused zinc is then filtered off, washing is carried out with glacial acetic acid and the filtrate is evaporated in a water-jet vacuum. The residue is taken up in methylene chloride and the solution is washed with sodium bicarbonate solution and with water, dried and evaporated. 86 mg. of pure crystalline $\Delta^5$-3$\beta$:11$\alpha$:20$\beta$-triacetoxy-19-oxopregnene melting at 176–178° C. (with decomposition) are obtained; $[\alpha]_D^{25}=-185°$ (in chloroform); IR-bands inter alia at 5.77$\mu$ (aldehyde+acetates); 8.10, 9.24, 9.36, 9.75, 10.45, 10.83 and 12.56$\mu$.

56 mg. of $\Delta^5$-3$\beta$:11$\alpha$:20$\beta$-triacetoxy-19-oxopregnene are dissolved in 5 cc. of acetone. To the solution, which has been cooled to 0° C., there is added 0.3 cc. of a 26.6% solution of chromium trioxide in sulfuric acid of 42% strength and the mixture is stirred for 45 minutes at 0° C. 1.0 cc. of isopropanol is then added and the mixture is diluted with benzene after 10 minutes and washed several times with water. The dried benzene solution is evaporated to dryness. 58 mg. of $\Delta^5$-3$\beta$:11$\alpha$:20$\beta$-triacetoxypregnene-19-acid, which melts at 154–158° C. after crystallization from ether, are obtained. IR-bands inter alia at 2.95, 5.78, 5.80, 8.17, 9.29, 9.41, 9.77, 10.50, 10.88 and 11.77$\mu$.

Example 9

A solution of 1.015 grams of $\Delta^5$-3$\beta$:11$\alpha$:20$\beta$-triacetoxy-19-oxopregnene in 100 cc. of benzene is mixed with 16 cc. of ethylene glycol and 80 mg. of para-toluenesulfonic acid, and the mixture is boiled for 8 hours with vigorous stirring and with the use of a water separator, then allowed to cool, poured into 100 cc. of dilute sodium bicarbonate solution, diluted with another 50 cc. of benzene and agitated. The benzene solution is washed with water, dried and evaporated in a water-jet vacuum, to yield 1.10 grams of amorphous $\Delta^5$-3$\beta$:11$\alpha$:20$\beta$-triacetoxy-19-ethylenedioxypregnene which contains in the infra-red spectrum bands inter alia at 5.78, 7.30, 8.11, 9.05, 9.24, 9.36 and 9.73$\mu$.

A solution of 375 mg. of the above compound in 40 cc. of methanol is mixed with a solution of 770 mg. of potassium carbonate in 12 cc. of water and then refluxed for 14 hours, concentrated in a water-jet vacuum to about 15 cc., diluted with 25 cc. of saturated sodium chloride solution and repeatedly extracted with a 4:1-mixture of methylene chloride and methanol. The extracts yield 35 mg. of crude $\Delta^5$-3$\beta$:11$\alpha$:20$\beta$-trihydroxy-19-ethylene dioxypregnene which after crystallization from acetone+ether, melts at 145–148° C. Optical rotation $[\alpha]_D=-80°$ (in chloroform).

A solution of 150 mg. of $\Delta^5$-3$\beta$:11$\alpha$:20$\beta$-trihydroxy-19-ethylenedioxypregnene in 50 cc. of acetone is mixed at 0° C. with 0.5 cc. of a 24.6% solution of chromium trioxide in sulfuric acid of 42% strength and the whole is stirred for 15 minutes at 0° C., then mixed with 1.5 cc. of isopropanol and stirred for another 5 minutes. The batch is then diluted with a solution of 1.0 gram of crystalline sodium acetate in 5 cc. of water, diluted with 150 cc. of benzene, filtered and washed twice with water. The benzene solution is dried and evaporated, to yield 140 mg. of $\Delta^5$-3:11:20-trioxo-19-ethylene-dioxypregnene as a pale yellowish residue which is dissolved in 20 cc. of glacial acetic acid, mixed with 500 mg. of anhydrous potassium acetate, and the solution is heated for 30 minutes at 100° C., then cooled, poured into 100 cc. of water and extracted with methylene chloride. The extracts are successively washed with water, dilute sodium bicarbonate solution and with water and yield on evaporation 125 mg. of crude $\Delta^4$-3:11:19:20-tetraoxopregnene which, after recrystallization from methylene chloride+ether, crystallizes in small scales which above about 170° C. turn into needles and melt at 205–207° C. Optical rotation $[\alpha]_D=+527°$ (in chloroform). Ultra-violet maximum at 267 m$\mu$ ($\epsilon$=11,150). Infra-red bands inter alia at 5.83, 5.95, 6.15, 7.19, 7.37, 8.16, 8.24, 8.65 and 11.60$\mu$.

Example 10

8.1 grams of 3$\beta$:17$\beta$-diacetoxy-5$\alpha$-bromo-6$\beta$:19-oxidoandrostane are dissolved in 170 ml. of glacial acetic acid. The solution is stirred, diluted with 8 ml. of water and kept at 40 to 50° C. while 50 grams of zinc dust are added within 40 minutes. The mixture is then filtered, the filtrate concentrated under reduced pressure, diluted with water and extracted with methylene chloride. The extracts are washed with dilute sodium bicarbonate solution, and water, dried and the solvents removed under reduced pressure. There is obtained 6.2 grams of residue which by recrystallization from methylene chloride-petroleum ether yields 5.9 grams of pure $\Delta^5$-3$\beta$:17$\beta$-diacetoxy-19-hydroxy androstene of melting point 145–146°; $[\alpha]_D=-58°$ (in chloroform).

A solution of 6.0 grams of this substance in 170 ml. of acetone is cooled to 0° C. and after addition of 7 ml. of a 4–N solution of chromium trioxide in dilute sulfuric acid the mixture is stirred for 20 minutes at 0° C. then diluted with water and the product is extracted with ether. The extracts are washed neutral with dilute sodium bicarbonate solution and with water, dried and concentrated to dryness. There is obtained 6.1 g. of $\Delta^5$-3$\beta$:17$\beta$-diacetoxy-19-oxo-androstene which after recrystallization from ether-petroleum ether melts at 118–122°. The product shows in the IR-spectrum bands, inter alia at 3.73, 5.80, 7.35, 8.10 and 9.70$\mu$.

Analogous reduction with zinc of 11.56 grams of 3$\beta$:20$\beta$-diacetoxy-5$\alpha$-bromo-6$\beta$:19-oxido-pregnane yields after recrystallization of the crude product from methylenechloride-ether 8.0 grams of pure $\Delta^5$-3$\beta$:20$\beta$-diacetoxy-19-hydroxy-pregnene, which melts at 129–130° C.

What is claimed is:

1. Process for the manufacture of 19-oxygenated $\Delta^5$-steroids wherein a 5$\alpha$-halogen-6$\beta$:19-oxido-steroid is treated with zinc and a lower fatty acid.

2. Process for the manufacture of 19-oxygenated $\Delta^5$-steroids wherein a 6$\beta$:19-lactone of a 5$\alpha$-halogen-6$\beta$-hydroxy-steroid-19-oic acid is used as a starting material.

3. Process according to claim 1, wherein a 5$\alpha$-halogen-6$\beta$:19-oxido-19-hydroxy-steroid is used as a starting material.

4. A process for the production of a compound selected from the group consisting of 19-hydroxy-$\Delta^5$-androstene and 19-hydroxy-$\Delta^5$-pregnene derivatives, which comprises treating the corresponding compound selected from the group consisting of 5$\alpha$-bromo-6$\beta$:19-oxido androstene and 5$\alpha$-bromo-6$\beta$:19-oxido pregnane derivatives with metals with an oxidation potential between +1.5 and +0.126 volts inclusive, in liquid hydrocarbon carboxylic acids of less than 12 carbon atoms.

5. Process according to claim 1, wherein a 6β:19-lactone of a 5α-halogen-6β-hydroxy-steroid-19-oic acid is used as a starting material.

6. Process according to claim 1, wherein a 5α-halogen-6β:19-oxido-19-hydroxy-steroid is used as a starting material.

7. Process for the manufacture of 19-oxygenated Δ⁵-steroids wherein a 5α-bromo-6β:19-oxido-steroid is treated with a zinc reducing agent as the metallic reducing agent.

8. Process for the manufacture of 19-oxygenated Δ⁵-steroids wherein a 5α-bromo-6β:19-oxido-steroid is treated with zinc and a lower fatty acid.

9. 19-hydroxy cholesterol.

References Cited by the Examiner
UNITED STATES PATENTS
3,065,228  11/1962  Bower _____ 260—349.55

LEWIS GOTTS, *Primary Examiner.*

MORRIS LIEBMAN, *Examiner.*

E. L. ROBERTS, *Assistant Examiner.*